(12) United States Patent
Feller et al.

(10) Patent No.: US 7,400,956 B1
(45) Date of Patent: Jul. 15, 2008

(54) SATELLITE POSITION AND HEADING SENSOR FOR VEHICLE STEERING CONTROL

(75) Inventors: Walter Feller, Airdrie (CA); Michael L. Whitehead, Scottsdale, AZ (US); John A. McClure, Scottsdale, AZ (US)

(73) Assignee: Hemisphere GPS Inc., Calgary (CA)

( * ) Notice: Subject to any disclaimer, the term of this patent is extended or adjusted under 35 U.S.C. 154(b) by 568 days.

(21) Appl. No.: 10/804,758

(22) Filed: Mar. 19, 2004

Related U.S. Application Data

(60) Provisional application No. 60/456,146, filed on Mar. 20, 2003.

(51) Int. Cl.
G01C 21/28 (2006.01)
G01C 21/00 (2006.01)
G05D 1/00 (2006.01)

(52) U.S. Cl. .......... 701/41; 701/213; 701/215; 701/205; 342/357.11

(58) Field of Classification Search .......... None
See application file for complete search history.

(56) References Cited

U.S. PATENT DOCUMENTS

| | | | |
|---|---|---|---|
| 5,375,059 A | 12/1994 | Krytsos et al. | |
| 5,416,712 A * | 5/1995 | Geier et al. | 701/216 |
| 5,491,636 A | 2/1996 | Robertson | 364/432 |
| 5,534,875 A | 7/1996 | Diefes et al. | 342/357.11 |
| 5,546,093 A | 8/1996 | Gudat et al. | |
| 5,548,293 A | 8/1996 | Cohen et al. | |
| 5,610,845 A | 3/1997 | Slabinski | 364/565 |
| 5,777,578 A | 7/1998 | Chang et al. | 342/357.06 |
| 5,862,501 A | 1/1999 | Talbot et al. | 701/50 |
| 5,875,408 A | 2/1999 | Bendett et al. | |
| 5,928,309 A | 7/1999 | Korver et al. | 701/214 |
| 5,940,026 A | 8/1999 | Popeck | 342/357.01 |
| 5,943,008 A | 8/1999 | Dusseldorp | 701/213 |
| 5,987,383 A | 11/1999 | Keller | 701/213 |
| 6,052,647 A | 4/2000 | Parkinson et al. | |
| 6,062,317 A | 5/2000 | Gharsalli | 172/2 |
| 6,191,733 B1 * | 2/2001 | Dizchavez | 342/357.17 |
| 6,199,000 B1 | 3/2001 | Keller et al. | 701/50 |
| 6,205,401 B1 | 3/2001 | Pickhard et al. | 701/220 |
| 6,236,924 B1 | 5/2001 | Motz | 701/50 |
| 6,325,684 B1 | 12/2001 | Knight | 440/6 |

(Continued)

FOREIGN PATENT DOCUMENTS

JP 7-244150 9/1995

(Continued)

*Primary Examiner*—Michael J. Zanelli
(74) *Attorney, Agent, or Firm*—Mark E. Brown

(57) ABSTRACT

A sensor system for vehicle steering control comprising: a plurality of global navigation satellite sensor systems (GNSS) including receivers and antennas at a fixed spacing to determine a vehicle position, velocity and at least one of a heading angle, a pitch angle and a roll angle based on carrier phase corrected real time kinematic (RTK) position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll and pitch, and configured to generate a steering command to a vehicle steering system.

7 Claims, 6 Drawing Sheets

U.S. PATENT DOCUMENTS

| | | | |
|---|---|---|---|
| 6,345,231 B2 | 2/2002 | Quincke | 701/213 |
| 6,434,462 B1 | 8/2002 | Bevly et al. | 701/50 |
| 6,445,983 B1 | 9/2002 | Dickson et al. | |
| 6,445,990 B1 | 9/2002 | Manring | 701/50 |
| 6,466,871 B1 | 10/2002 | Reisman et al. | 701/224 |
| 6,469,663 B1 | 10/2002 | Whitehead | 342/357.03 |
| 6,501,422 B1 | 12/2002 | Nichols | 342/357.17 |
| 6,671,587 B2 * | 12/2003 | Hrovat et al. | 701/1 |
| 6,703,973 B1 | 3/2004 | Nichols | |
| 2002/0038171 A1 | 3/2002 | Deguchi et al. | 701/41 |
| 2002/0165648 A1 | 11/2002 | Zeitler | |
| 2002/0165669 A1 | 11/2002 | Pinto et al. | |
| 2002/0169553 A1 * | 11/2002 | Perlmutter et al. | 701/214 |
| 2002/0175858 A1 | 11/2002 | Takahashi | 342/357.15 |
| 2003/0009282 A1 * | 1/2003 | Upadhyaya et al. | 701/213 |
| 2003/0187560 A1 | 10/2003 | Keller et al. | |

FOREIGN PATENT DOCUMENTS

| | | |
|---|---|---|
| WO | 98/36288 | 8/1998 |

* cited by examiner

SATELLITE POSITION AND HEADING SENSOR FOR VEHICLE STEERING CONTROL

CROSS-REFERENCE TO RELATED APPLICATIONS

This application claims the benefit of U.S. Provisional Application No. 60/456,146, filed Mar. 20, 2003 the contents of which are incorporated by reference herein in their entirety.

BACKGROUND

The invention relates generally to automatic guidance systems and more specifically to global positioning system based sensor for vehicle steering control.

Movable machinery such as agricultural equipment, open-pit mining machines and airplane crop dusters and the like all benefit from accurate global positioning system (GPS) high precision survey products, and others. However, in existing satellite positioning systems (SATPS) for guided parallel swathing for precision farming, mining, and the like, the actual curvature of terrain may not be taken into account. This results in a less than precise production because of the less than precise parallel swathing. Indeed, in order to provide parallel swaths through a field (in farming for example), the guidance system collects positions of the vehicle as it moves across the field. When the vehicle commences the next pass through the field, the guidance system offsets the collected positions for the previous pass by the width of the equipment complement (i.e. swath width). The next set of swath positions are used to provide guidance to the operator as he drives vehicle through the field.

The current vehicle location as compared to the desired swath location is provided to the operator. The SATPS provides the 3-D location of signal reception (for instance, the 3-D location of the antenna). If only 3-D coordinates are collected, the next swath computations assume a flat terrain offset. However, the position of interest is often not the same as where the satellite receiver (SR) is located since the SR is placed in the location for good signal reception. For example, for a tractor towing an implement, the best location for the SR may be on top of the tractor cab will experience large attitude excursions as the tractor swaths the field, but the position of interest (POI) for providing guidance to the tractor operator may be the position on the ground below the operator. If the tractor is on a flat terrain, determining this POI is a simple adjustment to account for the antenna height.

However, if the tractor is on an inclined terrain with a variable tilt, which is often the case, the SATPS alone cannot determine the terrain tilt so the POI also cannot be determined. This results in a guidance error because the POI is approximated by the point of reception (POR), and this approximation worsens as the terrain inclination increases. This results in cross track position excursions relative to the vehicle ground track which would contaminate any attempt to parallel a defined field line or swath. On inclined terrain, this error can be minimized by collecting vehicle tilt configuration along each current pass or the previous pass. The swath offset thus becomes a vector taking the terrain inclination into account with the assumption that from the first swath to the next one the terrain inclination does not change too much. It can therefore be seen that there is a need for a better navigation/guidance system for use with a ground-based vehicle.

Various navigation systems for ground-based vehicles have been employed but each includes particular disadvantages. Systems using Doppler radar will encounter errors with the radar and latency. Similarly, gyroscopes, which may provide heading, roll, or pitch measurements, may be deployed as part of an inertial navigation package, encounter drift errors and biases. Gyroscopes have good short-term characteristics but undesirable long-term characteristics, especially those gyroscopes of lower cost such as those based on a vibrating resonator. Similarly, inertial systems employing gyroscopes and accelerometers have good short-term characteristics but also suffer from drift. Various systems include navigating utilizing GPS, however, these systems also exhibit disadvantages. Existing GPS position computations include may include lag times, which may be especially troublesome when, for example, GPS velocity is used to derive vehicle heading. As a result, the position (or heading) solution provided by a GPS receiver tells a user where the vehicle was a moment ago, not in real time. Existing GPS systems do not provide high quality heading information at slower vehicle speeds. Therefore, what is needed is a low cost sensor system to facilitate vehicle swath navigation.

BRIEF SUMMARY

Disclosed herein in an exemplary embodiment is a sensor system for vehicle steering control comprising: a plurality of global navigation satellite sensor systems (GNSS) including receivers and antennas at a fixed spacing to determine a vehicle position, velocity and at least one of a heading angle, a pitch angle and a roll angle based on carrier phase corrected real time kinematic (RTK) position differences. The roll angle facilitates correction of the lateral motion induced position errors resultant from motion of the antennae as the vehicle moves based on an offset to ground and the roll angle. The system also includes a control system configured to receive the vehicle position, heading, and at least one of roll and pitch, and configured to generate a steering command to a vehicle steering system.

Also disclosed herein in another exemplary embodiment is a method for computing a position of a vehicle comprising: initializing a global navigation satellite sensor systems (GNSS); computing a first position of a first GNSS antenna on the vehicle; computing a second position of a second GNSS antenna; and calculating a heading as a vector perpendicular to a vector joining the first position and the second position, in a horizontal plane aligned with the vehicle. The method also includes computing a roll angle of the vehicle as an arctangent of a ratio of differences in heights of the first GNSS antenna and the second GNSS antenna divided by a spacing between their respective phase centers and calculating an actual position at the center of the vehicle projected to the ground using the computed roll angle and a known height from the ground of at least one of the first GNSS antenna and the second GNSS antenna.

Further disclosed herein in yet another exemplary embodiment is a method of controlling a vehicle comprising: computing a position and a heading for the vehicle; computing a steering control command; based on a proportionality factor multiplied by a difference in a desired position versus an actual position, plus a second proportionality factor multiplied by a difference in a desired heading versus an actual heading, the second proportionality factor ensuring that when the vehicle attains the desired position the vehicle is also directed to the desired heading, and thereby avoiding crossing a desired track. The method also includes a recursive adaptive algorithm employed to characterize the vehicle response and selected dynamic characteristics. The method further includes applying selected control values to a vehicle steering control mechanism and measuring responses of the vehicle thereto; calculating response times and characteristics for the vehicle based on the responses; and calibrating the control commands by applying a modified control command based on the responses to achieve a desired response.

BRIEF DESCRIPTION OF THE DRAWINGS

Referring now to the drawings wherein like elements are numbered alike in the several FIGURES.

DETAILED DESCRIPTION

Figure 1:
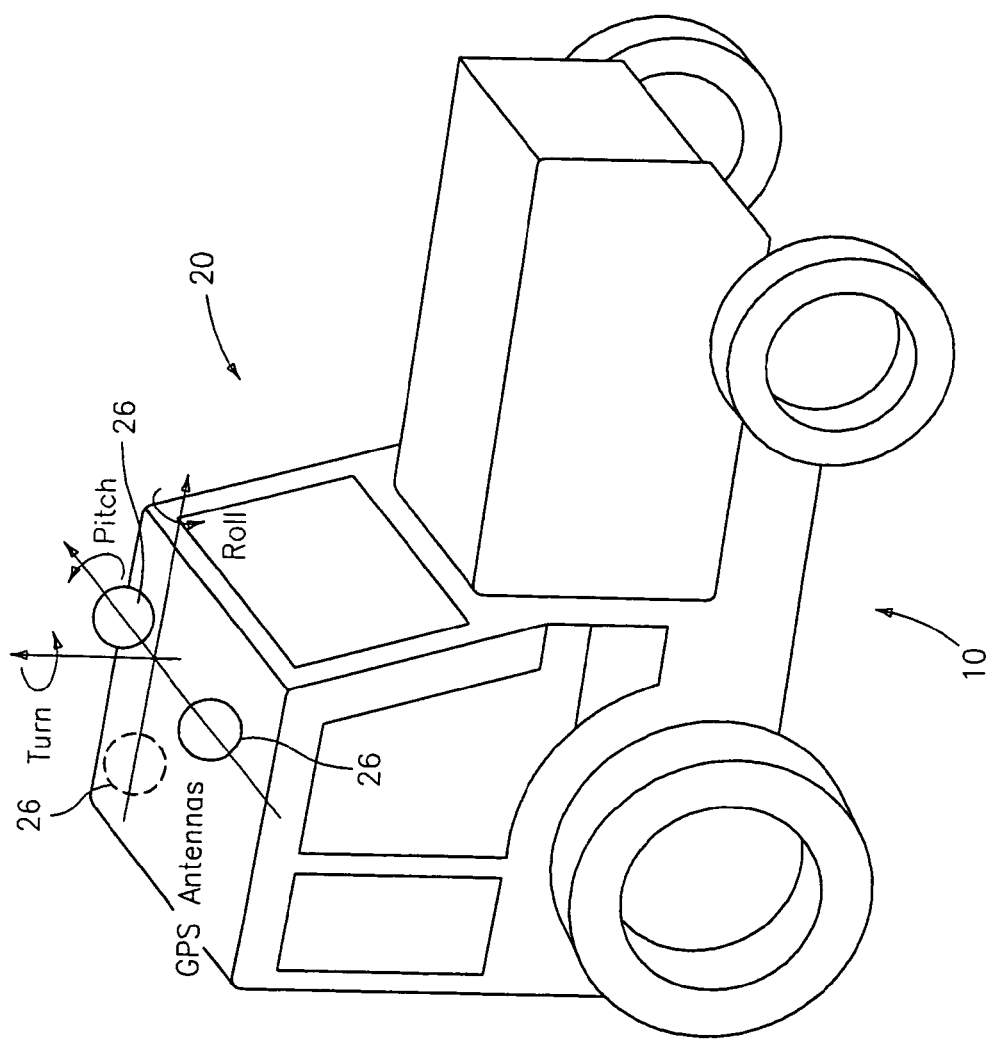
FIG. 1 depicts an illustrative diagram of a vehicle including an exemplary embodiment.

Disclosed herein in an exemplary embodiment is a sensor system for vehicle guidance. The sensor system utilizes a plurality of GPS carrier phase differenced antennas to derive attitude information. Moreover, the GPS position may optionally be combined with one or more rate gyro(s) used to measure turn rates. In an exemplary embodiment, the rate gyros and GPS receiver/antenna are integrated together within the same unit, to provide multiple mechanisms to characterize a vehicles motion and position to make a robust vehicle steering control mechanism.

It is known in the art that by using GPS satellite's carrier phase, and possibly carrier phases from other satellites such as WAAS satellites, a position may readily be determined to within millimeters. When accomplished with two antennas at a fixed spacing, an angular rotation may be computed using the position differences. In an exemplary embodiment, two antennas placed in the horizontal plane may be employed to compute a heading (rotation about a vertical axis) from a position displacement. It will be appreciated that an exemplary embodiment may be utilized to compute not only heading, but either roll (rotation about a longitudinal axis) or pitch (rotation about a lateral axis) depending on orientation of the antennas relative to the vehicle. Heading information, combined with position, either differentially corrected (DGPS) or carrier phase corrected (RTK) provides the feedback information desired for a proper control of the vehicle direction. Addition of one or more rate gyros further provides independent measurements of the vehicles dynamics and facilitates vehicle steering control.

Existing systems for vehicle guidance may employ separate gyros, and separate GPS positioning systems. However, such systems do not provide an integrated heading sensor based on GPS as disclosed herein. Moreover, separate systems exhibit the limitations of their respective technologies as mentioned earlier. The exemplary embodiments as described herein, eliminate the requirements of existing systems for other means to correct for vehicle roll. Moreover, an implementation of an exemplary embodiment also provides an independent means of calculating heading and heading rate of change (turn rate). Optionally, if an additional gyro(s) is utilized, a second, perhaps higher quality measurement of turn rate and roll-rate is provided.

Another benefit is that achieved by incorporating a GPS-based heading sensor is the elimination or reduction of drift and biases resultant from a gyro-only or other inertial sensor approach. Yet another advantage is that heading may be computed while vehicle is stopped or moving slowly, which is not possible in single-antenna GPS based approach that requires a vehicle velocity vector to derive heading. Yet another advantage of an exemplary embodiment is that combination of the aforementioned sensors provides sufficient information for a feedback control system to be developed, which is standalone and independent of a vehicle's sensors or additional external sensors. Thus, such a system is readily maintained as vehicle-independent and may be moved from one vehicle to another with minimal effort. Yet another exemplary embodiment of the sensor employs Global Navigation Satellite System (GNSS) sensors and measurements to provide accurate, reliable positioning information. GNSS sensors include, but are not limited to GPS, Global Navigation System (GLONAS), Wide Area Augmentation System (WAAS) and the like, as well as combinations including at least one of the foregoing.

An example of a GNSS is the Global Positioning System (GPS) established by the United States government that employs a constellation of 24 or more satellites in well-defined orbits at an altitude of approximately 26,500 km. These satellites continually transmit microwave L-band radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites, an ionosphere model and other useful information. GPS receivers process the radio signals, computing ranges to the GPS satellites, and by triangulating these ranges, the GPS receiver determines its position and its internal clock error.

In standalone GPS systems that determine a receiver's antenna position coordinates without reference to a nearby reference receiver, the process of position determination is subject to errors from a number of sources. These include errors in the GPS satellite's clock reference, the location of the orbiting satellite, ionosphere induced propagation delay errors, and troposphere refraction errors.

To overcome the errors of the standalone GPS system, many positioning applications, have made use of data from multiple GPS receivers. Typically, in such applications, a reference receiver, located at a reference site having known coordinates, receives the GPS satellite signals simultaneously with the receipt of signals by a remote receiver. Depending on the separation distance between the two GPS receivers, many of the errors mentioned above will affect the satellite signals equally for the two receivers. By taking the difference between signals received both at the reference site and the remote location, the errors are effectively eliminated. This facilitates an accurate determination of the remote receiver's coordinates relative to the reference receiver's coordinates.

The technique of differencing signals from two or more GPS receivers to improve accuracy is known as differential GPS (DGPS). Differential GPS is well known and exhibits many forms. In all forms of DGPS, the positions obtained by the end user's remote receiver are relative to the position(s) of the reference receiver(s). GPS applications have been improved and enhanced by employing a broader array of satellites such as GNSS and WAAS. For example, see commonly assigned U.S. Pat. No. 6,469,663 B1 to Whitehead et al. titled Method and System for GPS and WAAS Carrier Phase Measurements for Relative Positioning, dated Oct. 22, 2002 the disclosures of which are incorporated by reference herein in their entirety. Additionally, multiple receiver DGPS has been improved has been enhanced by utilizing a single receiver to perform differential corrections. For example, see commonly assigned U.S. Pat. No. 6,397,147 B1 to Whitehead titled Relative GPS Positioning Using A Single GPS Receiver With Internally Generated Differential Correction Terms, dated May 28, 2002 the disclosures of which are incorporated by reference herein in their entirety.

Figure 2:
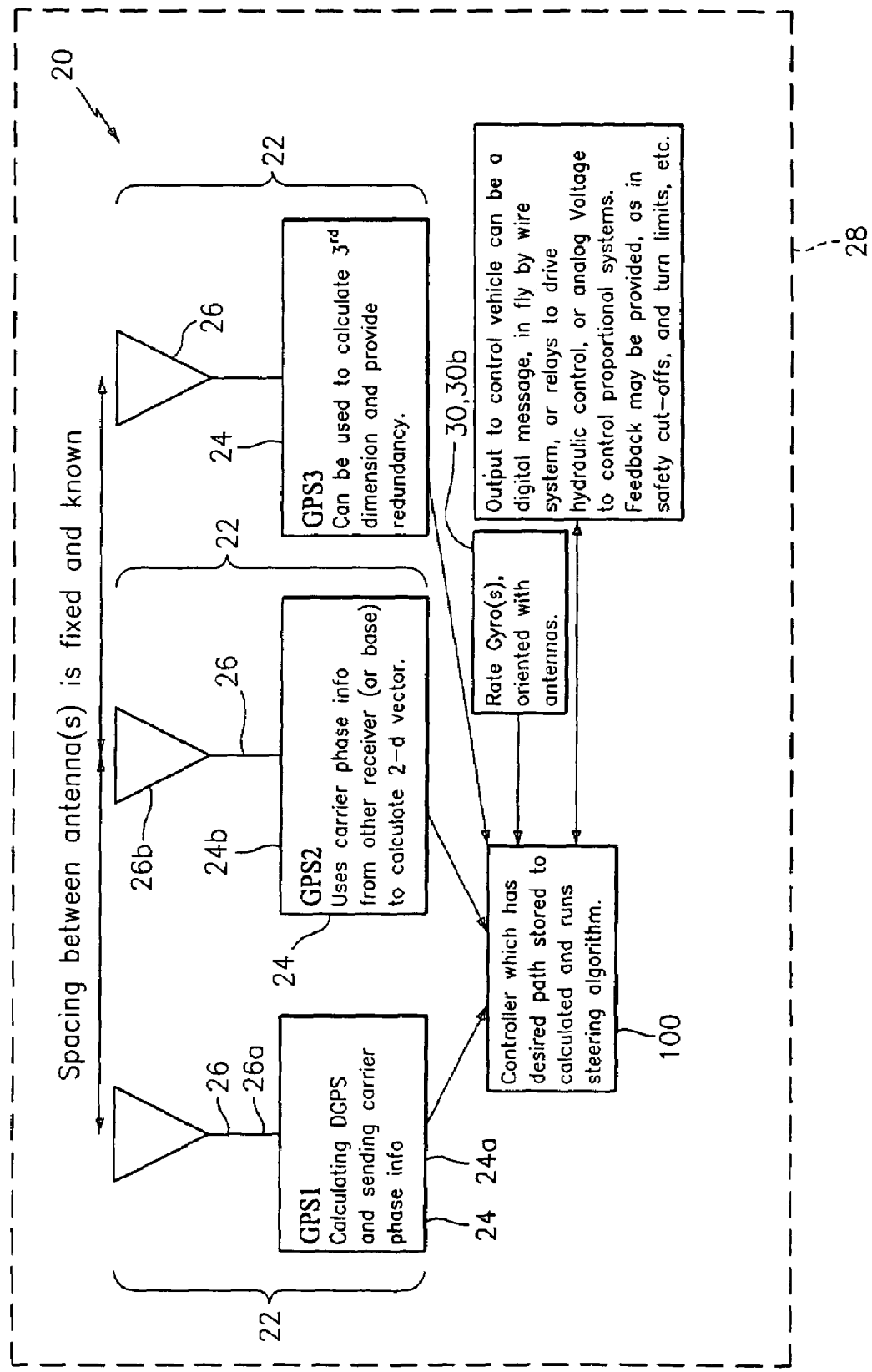
FIG. 2 depicts an illustrative block diagram of vehicle including an exemplary embodiment of a sensor system.
Figure 3:
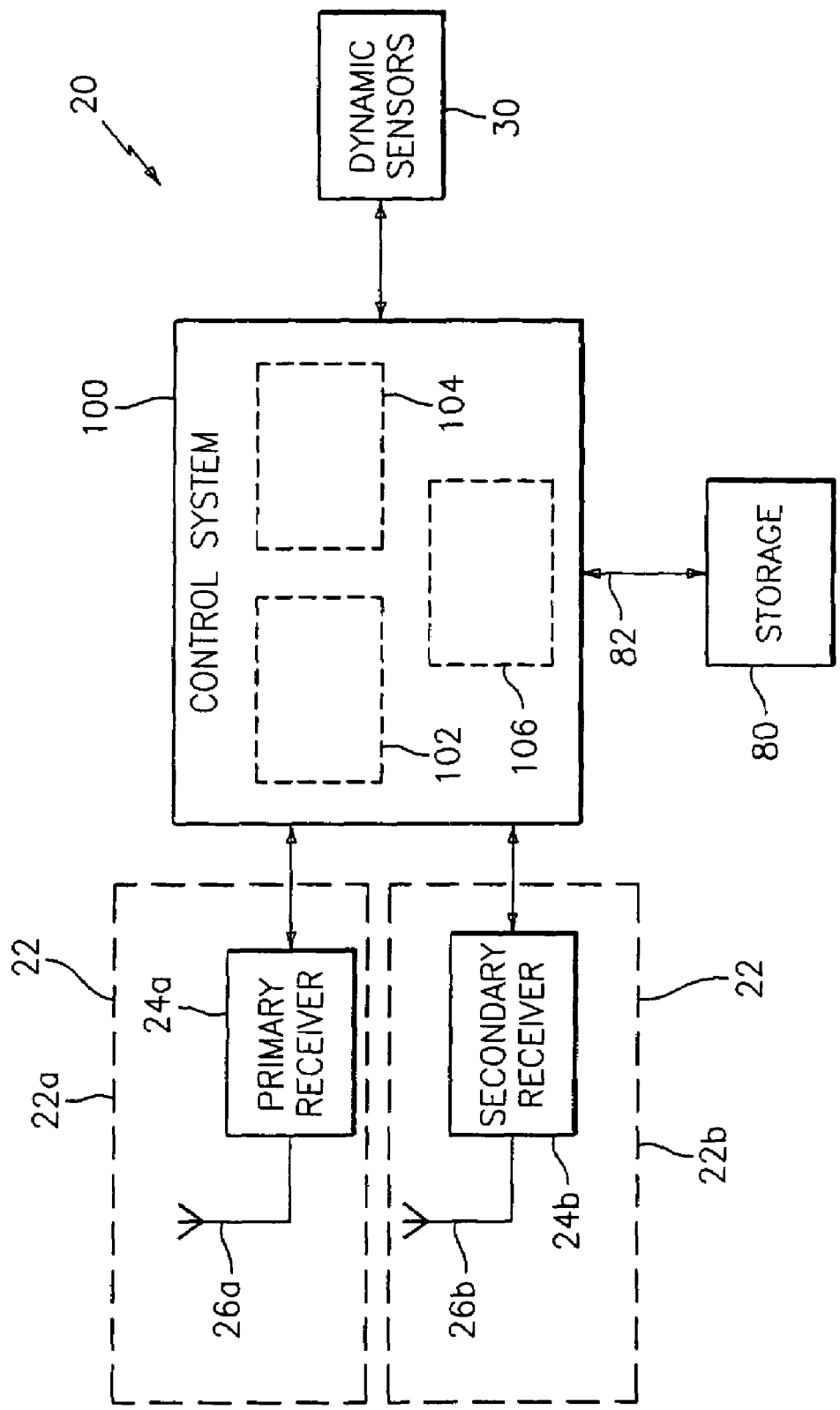
FIG. 3 depicts an illustrative block diagram of a sensor system in accordance with an exemplary embodiment.

Referring now to FIGS. 1 through 4, an illustrative vehicle 10 is depicted including a sensor system 20 in accordance with an exemplary embodiment. Referring also to FIGS. 2 and 3, blocks diagram of the sensor system 20 is depicted. The sensor system 20 includes, but is not limited to a plurality of GNSS receiver and antenna systems 22, each comprising at least a GNSS receiver 24 and antenna 26. The GNSS receiver/antennal systems 22 co-operate as a primary receiver system 22a and a secondary receiver system 22b, with their respective antennas 24a and 24b mounted with a known separation. The primary receiver 22a system may also be denoted as a reference or master receiver system, while the secondary receiver system 22b may also be denoted as a remote or slave receiver system. It will also be appreciated that the selection of one receiver as primary versus secondary need not be of significance, it merely provides a means for distinguishing between systems, partitioning of functionality, and defining measurements references to facilitate description. It should be appreciated that the nomenclature could readily be transposed or modified without impacting the scope of the disclosure or the claims.

The sensor system 20 is optionally, configured to mounted within a single enclosure 28 to facilitate transportability. In an exemplary embodiment, the enclosure 28 can be any rigid assembly, fixture, or structure that causes the antennas 26 to be maintained a substantially fixed relative position with respect to one another. In an exemplary embodiment, the enclosure 28 may be a lightweight bracket or structure to facilitate mounting of other components and transportability. Although the enclosure 28 that constrains the relative location of the two antennas 26a and 26b may have virtually an position and orientation in space, the two respective receivers 24 (reference receiver 24a and remote receiver 24b) are configured to facilitate communication with one another and resolve the attitude information from the phase center of the reference antenna 26a to the phase center of the remote antenna 26b with a high degree of accuracy.

Yet another embodiment employs a GNSS sensor 20 in the embodiments above augmented with supplementary inertial sensors 30 such as accelerometers, gyroscopes, or an attitude heading reference system. More particularly, in an implementation of an exemplary embodiment, one or more rate gyro(s) is integrated with the GNSS sensor 20. Hereinafter, a supplementary dynamic sensor 30 shall be referred to as a yaw rate gyro 30 without limitation.

In yet another exemplary embodiment, a gyro that measures roll-rate may also be combined with this system's GPS-based roll determination. A roll rate gyro denoted 30b would provide improved short-term dynamic rate information to gain additional improvements when computing the sway of the vehicle 10, particularly when traveling over uneven terrain.

It will be appreciated that to supplement the embodiments disclosed herein, the data used by each GNSS receiver 30 may be coupled with data from supplementary sensors 50, including, but not limited to, accelerometers, gyroscopic sensors, compass', magnetic sensors, inclinometers, and the like, as well as combinations including at least one of the foregoing. Coupling GNSS data with measurement information from supplementary sensors 30, and/or correction data for differential correction improves positioning accuracy, improves initialization durations and enhances the ability to recover for data outages. Moreover, such coupling may further improve e.g., reduce, the length of time required to solve for an accurate attitude data.

It will be appreciated that although not a requirement, the location of the reference antenna 26a can be considered a fixed distance from the remote antenna 26b. This constraint may be applied to the azimuth determination processes in order to reduce the time required to solve for accurate azimuth, even though both antennas 26a and 26b may be moving in space or not at a known location. The technique of resolving the attitude information and position information for the vehicle 10 may employ carrier phase DGPS techniques with a moving reference station. Additionally, the use of data from auxiliary dynamic sensors aids the development of a heading solution by applying other constraints, including a rough indication of antenna orientation relative to the Earth's gravity field and or alignment to the Earth's magnetic field.

Producing an accurate attitude from the use of two or more GNSS receiver and antenna systems 22 has been established in the art and therefore, will not be expounded upon herein. The processing is utilized herein as part of the process required to implement an exemplary embodiment. Moreover, there are numerous processes and procedures for integrating GNSS data with that from an inertial or gyroscopic sensor. Once again, these techniques are identified herein and their teachings utilized as part of the art for performing the prescribed functionality.

Figure 4:
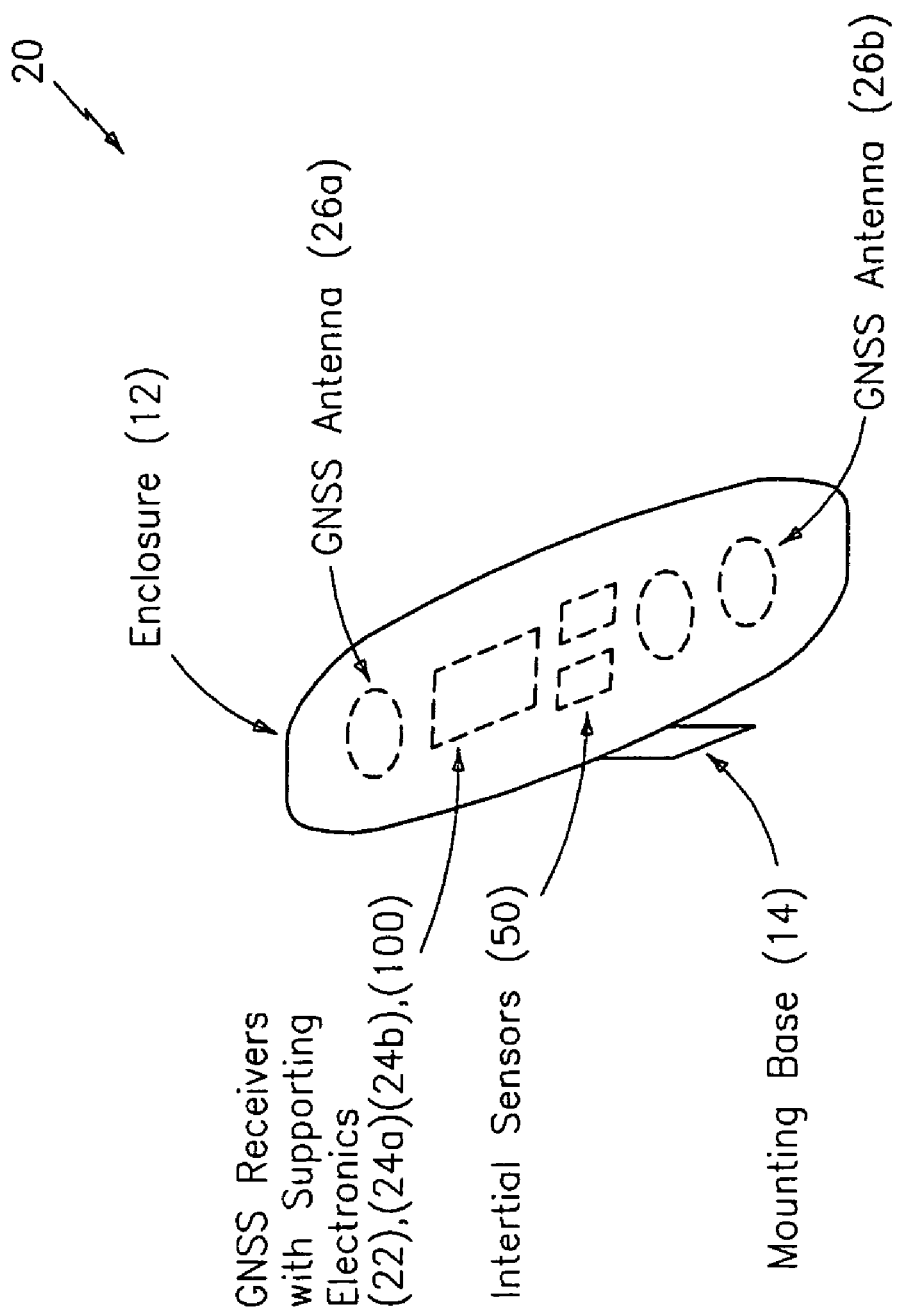
FIG. 4 depicts an illustrative sensor system in accordance with an exemplary embodiment.

Referring also to FIG. 4, a mechanism for ensuring an accurate orientation of the sensor system 20 to the vehicle 10 may be provided for by an optional mounting base 14 accurately attached to the enclosure 28. An accurate installation ensures that substantially no misalignment error is present that may otherwise cause the sensor system 20 to provide erroneous heading information. The mounting base 14 is configured such that it fits securely with a determinable orientation relative to the vehicle 10. In an exemplary embodiment, for example, the mounting base 14 is configured to fit flatly against the top surfaces of the vehicle 10 to facilitate an unimpeded view to the GNSS satellites.

With the sensor system 20 affixed and secured in the vehicle 20 power up and initialization of the sensor system 20 is thereafter executed. Such an initialization may include, but not be limited to using the control system 100 to perform any initialization or configuration that may be necessary for a particular installation, including the configuration of an internal log file within the memory of the sensor system 20.

The sensor 20 may further include additional associated electronics and hardware. For example, the sensor 20 may also include a power source 32 e.g., battery, other power generation means, e.g., photovoltaic cells and the like. Moreover, the sensor system 20 may further include a control system 100. The control system 100 may include but not be limited to a controller/computer 102, display 104 and input device 106 such as a keypad or keyboard for operation. The controller 102 may include, without limitation, a computer or processor, logic, memory, storage, registers, timing, interrupts, input/output signal interfaces, and communication interfaces as required to perform the processing and operations prescribed herein. The controller preferably receives inputs from various systems and sensors elements of sensor system 20 (GNSS, inertial, etc.), and generates output signals to control the same and direct the vehicle 10. For example, the controller 102 may receive such inputs as the GNSS satellite and receiver data and status, inertial system data, and the like from various sensors. In an exemplary embodiment, the control system 100 provides the user with information relating to the current orientation, attitude, and velocity of the vehicle 10 as well as computing a desired swath on the ground. The control system 100 will also allow the operator to configure the various settings of the sensor system 20 and monitor GNSS signal reception and any other sensors of the sensor system 20. In an exemplary embodiment, the sensor system 20 is self-contained. The control system 100, electronics, receivers 24, antennas 26, and any other sensors, including a power source are contained within the enclosure 12, to facilitate ease of manipulation, transportability, and operation.

Figure 5:
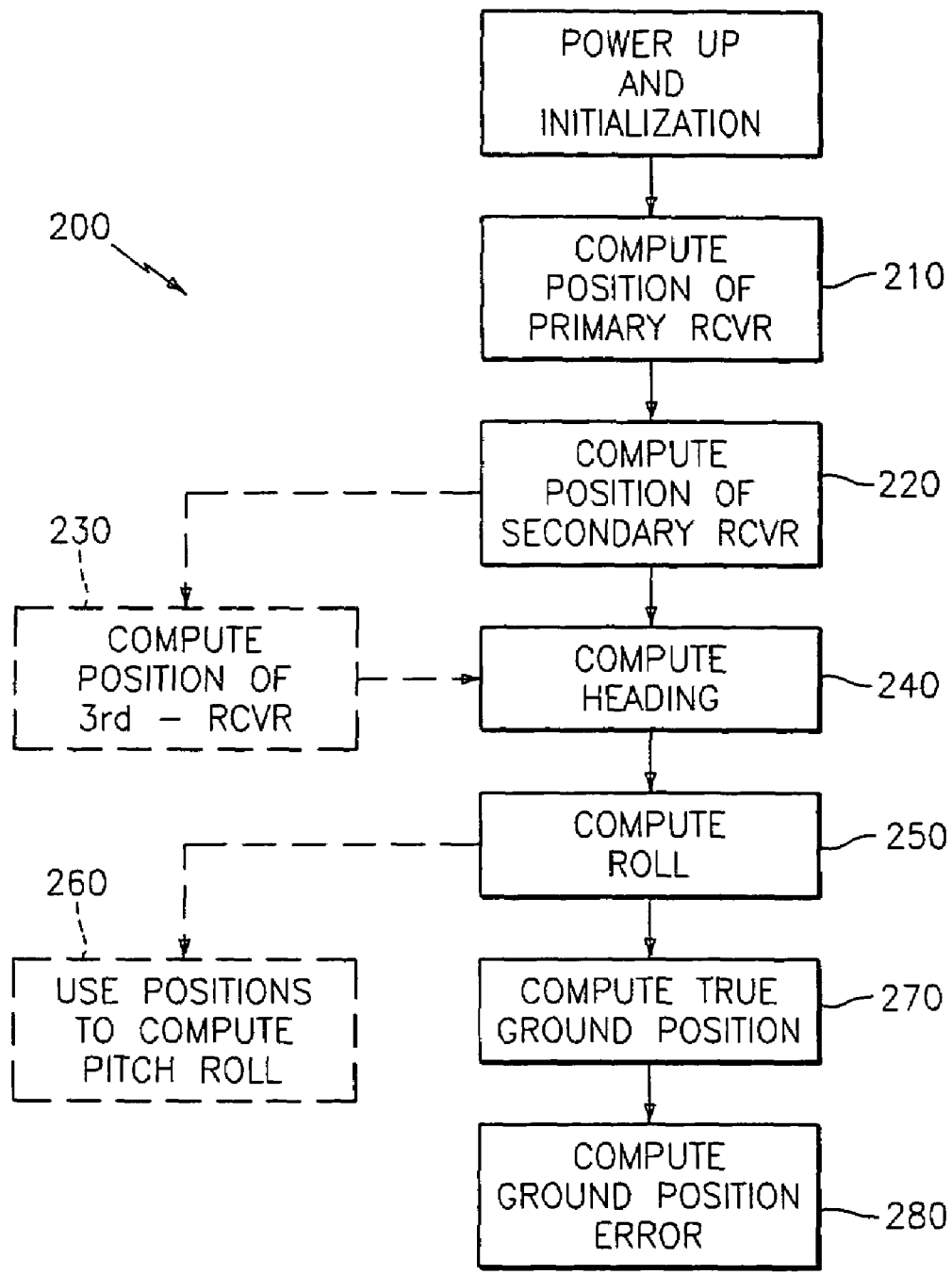
FIG. 5 depicts an illustrative flow chart of an exemplary process for determining a steering command for a vehicle in accordance with an exemplary embodiment.

Referring now to FIG. 5, a flowchart diagrammatically depicting an exemplary methodology for executing a control process 200 is provided. In an exemplary control process 200, such as may be executed by an operator in conjunction with a control system 100, a set of commands are incorporated into the sensor system 20 to output corrected 3-D position, velocity, heading, tilt, curvature (degrees per second) and radius of curvature and the like.

Referring to the figure, as shown at block 210, the primary receiver and antenna system 22a computes its position, denoted p1(x1, y1, z1). Referring now to block 220, wherein the secondary receiver and antenna system 22b computes its position, denoted p2(x2, y2, z2). Referring now to block 230, optionally additional receiver and antenna system(s) 22 computed their respective positions, denoted p3(x3, y3, z3)–pn(xn, yn, zn). wherein the secondary receiver and antenna system 22b computes its position, denoted p2(x2, y2, z2).

At process block 240 employing a geometric calculation, the heading is computed as the vector perpendicular to the vector joining the two positions, in the horizontal plane (assuming they are aligned with the vehicle). Furthermore, at block 250 the roll of the vehicle 10 may readily be computed as the arc-tangent of the ratio of the difference in heights of the two antennas 26a and 26b divided by the spacing between their phase centers (a selected distance within the enclosure 12). It will be appreciated that optionally, if additional receiver and antenna systems are utilized, and configured for additional measurements, the pitch and roll angles may also be computed using differential positioning similar to the manner for computing heading. Therefore in the figure, optionally at process block 260 the pitch and roll may be computed.

Continuing with the figure, at process block 270, using the computed roll angle and a known antenna height (based on the installation in a given vehicle 10), the actual position at the center of the vehicle 10 projected to the ground may be calculated. This position representing a true ground position of the vehicle 10. Once the ground position is known, the error value representing the difference between where the vehicle should be based on a computed swath or track and where it actually is, is readily calculated as shown at block 280.

Advantageously, it will be appreciated that optionally, the vector velocities of the vehicle 10 are also known or readily computed based on existing course and heading of the vehicle 10. These vector velocities may readily be utilized for control and instrumentation tasks.

Figure 6:
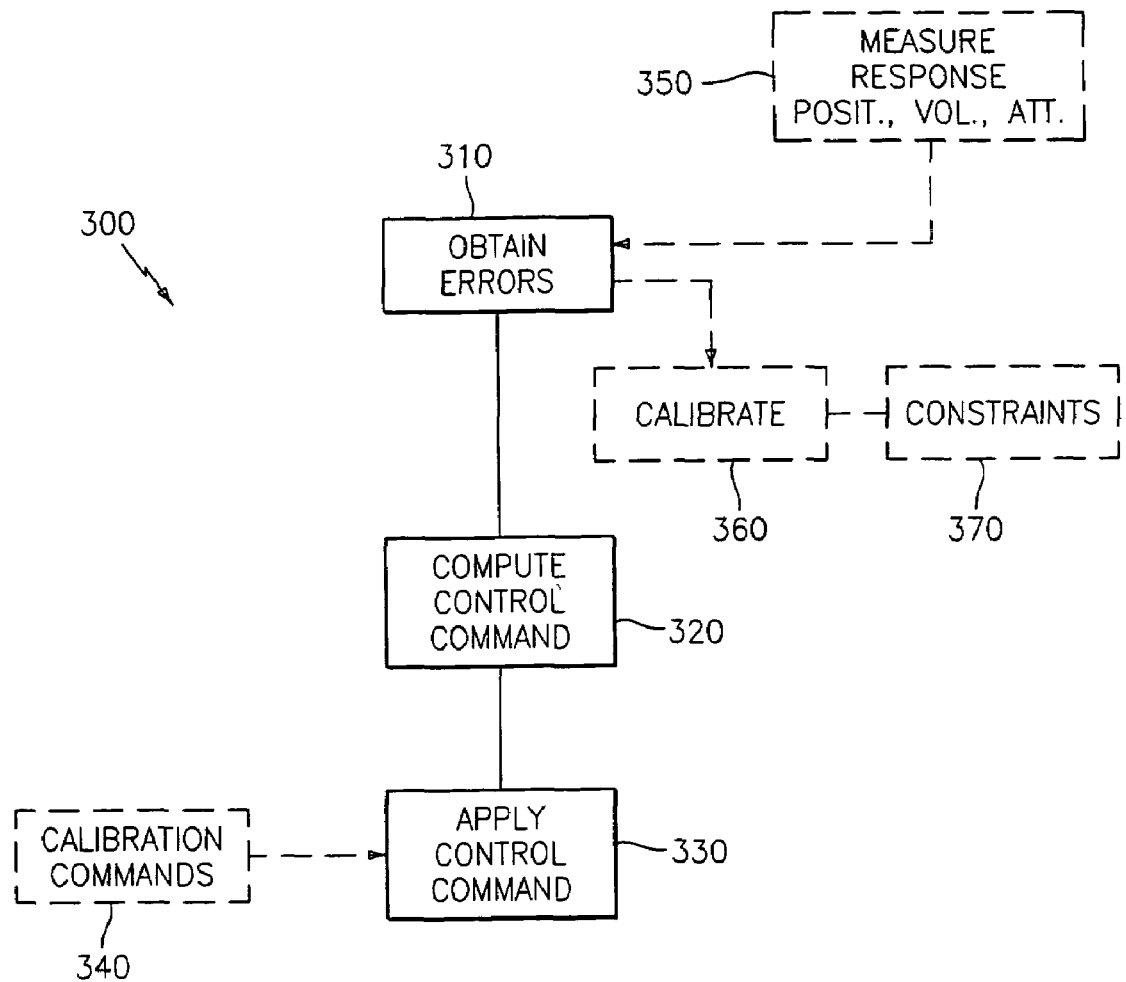
FIG. 6 depicts an illustrative flow chart of an exemplary process for determining a steering command with an exemplary sensor system in accordance with an alternative embodiment.

Turning now to FIG. 6, in an exemplary embodiment a steering control process 300 may then be created to utilize the abovementioned information from the sensor system 20 to direct the vehicle motion. At process block 310 the steering control may be initiated by obtaining the computed errors from process 200. Turning to block 320 the steering control process 300 may be facilitated by computing a steering control command based on a proportionality factor times the difference in desired position versus actual position (computed position error) plus second proportionality factor times difference in desired heading versus actual heading (heading error). The second proportionality factor ensures when the vehicle attains the desired position it is actually directed to the correct heading, rather than crossing the track. Such an approach will dramatically improve steering response and stability. At process block 330, a steering command is generated and directed to the vehicle 330.

Moreover, continuing with FIG. 6, optionally, a recursive adaptive algorithm may also be employed to characterize the vehicle response and selected dynamic characteristics. In an exemplary embodiment, the sensor system 20 applies selected control values to the vehicle steering control mechanism as depicted at optional block 340 and block 330. The sensor system 20 measures the response of the vehicle 10 as depicted at process block 350 and calculates the response times and characteristics for the vehicle. For example, a selected command is applied and the proportionality of the turn measured given the selected change in steering. Turning to process block 360, the responses of the vehicle are then utilized to calibrate the control commands applying a modified control command to achieve a desired response. It will be appreciated that such an auto-calibration feature would possibly be limited by constraints of the vehicle to avoid excess stress or damage as depicted at 370.

It will be appreciate that while a particular series of steps or procedures is described as part of the abovementioned alignment process, no order of steps should necessarily be inferred from the order of presentation. For example, the process 200 includes installation and power up or initialization. It should be evident that power-up and initialization could potentially be performed and executed in advance without impacting the methodology disclosed herein or the scope of the claims.

It should further be appreciated that while an exemplary partitioning functionality has been provided. It should be apparent to one skilled in the art, that the partition could be different. For example, the control of the primary receiver 40a and secondary receiver 40b, as well as the functions of the controller 72 could be integrated in any, or another unit. The processes for determining the alignment may, for ease of implementation, be integrated into a single receiver. Such configuration variances should be considered equivalent and within the scope of the disclosure and claims herein.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 80, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal 82 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A sensor system for controlling a vehicle steering system, which sensor system comprises:
   a global navigation satellite sensor (GNSS) attitude subsystem including a receiver and multiple antennas connected to said receiver at a fixed spacing, said GNSS attitude subsystem computing vehicle position and attitude;
   a yaw gyroscope connected to said GNSS attitude subsystem and configured to derive and provide an output including a yaw angular rate of change;
   means for calibrating bias and scale factor errors in the yaw gyroscope using said reference attitude angles; and
   a steering control subsystem connected to said yaw gyroscope and said GNSS attitude subsystem and using said yaw angle and yaw angle rate of change outputs from said yaw gyroscope for computing and outputting steering control commands to the vehicle steering system from the current position and heading to the desired position and heading; and
   means for automatically calibrating said steering control commands using GNSS-derived vehicle position.

2. The system according to claim 1, which includes:
   a roll gyroscope connected to said GNSS attitude subsystem and configured to derive and provide an output including a roll angular rate of change:
   said GNSS attitude subsystem including a function for calibrating bias and scale factor errors in the roll gyroscope using said reference attitude angles; and
   said steering control subsystem connected to said roll gyroscope and using said roll angle rate of change output from said roll gyroscope for computing and outputting steering control commands to the vehicle steering system.

3. The system according to claim 2, which includes:
   said roll gyroscope output including a roll angle; and
   said steering control subsystem using said roll angle output from said roll gyroscope for computing and outputting steering control commands to the vehicle steering system.

4. The system according to claim 2, which includes:
   said GNSS attitude subsystem deriving said steering control commands from a combination of yaw and roll gyroscope outputs and GNSS-derived attitude reference yaw and roll angles.

5. The system according to claim 4, which includes:
   said GNSS attitude subsystem deriving a roll angle;
   and said steering control system using said roll angle to compensate for vehicle roll in said steering control commands.

6. The system according to claim 5, which includes:
   said roll angle compensation function being enhanced by said roll gyroscope output.

7. A method of controlling a vehicle steering system, which comprises the steps of:
   providing a global navigation satellite sensor (GNSS) attitude subsystem including a receiver and multiple antennas connected to said receiver at a fixed spacing;
   computing vehicle position and attitude with said GNSS attitude subsystem;
   providing a yaw gyroscope connected to said GNSS attitude subsystem;
   configuring said yaw gyroscope to derive and provide an output including a yaw angle and yaw angle rate of change and deriving and providing such output;
   reducing bias and drift errors in said yaw gyroscope using said vehicle attitude;
   using said yaw angle and said yaw angle rate of change output from said yaw gyroscope for computing and outputting steering control commands to the vehicle steering system from the current position and heading to the desired position and heading; and
   automatically calibrating said steering control commands using GNSS-derived vehicle position.

* * * * *